| (12) | United States Patent | (10) Patent No.: | US 10,648,519 B2 |
|---|---|---|---|
| | Przybyla | (45) Date of Patent: | May 12, 2020 |

(54) TORQUE PATH COUPLING ASSEMBLIES FOR TILTROTOR AIRCRAFT

(71) Applicant: Textron Innovations Inc., Providence, RI (US)

(72) Inventor: Mark Alan Przybyla, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 287 days.

(21) Appl. No.: 15/914,527

(22) Filed: Mar. 7, 2018

(65) Prior Publication Data

US 2019/0277353 A1 Sep. 12, 2019

(51) Int. Cl.
| F16D 47/04 | (2006.01) |
| B64C 27/52 | (2006.01) |
| B64C 27/30 | (2006.01) |
| B64C 27/28 | (2006.01) |
| B64C 11/28 | (2006.01) |
| B64C 11/00 | (2006.01) |
| B64C 29/00 | (2006.01) |
| F16D 23/04 | (2006.01) |

(Continued)

(52) U.S. Cl.
CPC .............. *F16D 47/04* (2013.01); *B64C 11/00* (2013.01); *B64C 11/28* (2013.01); *B64C 27/28* (2013.01); *B64C 27/30* (2013.01); *B64C 27/52* (2013.01); *B64C 29/0033* (2013.01); *B64D 35/04* (2013.01); *F16D 23/04* (2013.01); *F16D 41/069* (2013.01)

(58) Field of Classification Search
CPC ......... B64C 11/28; B64C 27/22; B64C 27/26; B64C 27/28; B64C 27/30; B64C 27/52; Y10T 403/7031; Y10T 403/10

USPC ........................... 403/359.3, 359.1–2, 4–6, 1
See application file for complete search history.

(56) References Cited

U.S. PATENT DOCUMENTS 3,419,121 A * 12/1968 Stott .................... F16D 23/0606
                                                192/53.331
3,515,500 A     6/1970 Nachod
3,528,630 A     9/1970 Ferris et al.
(Continued)

OTHER PUBLICATIONS

European Search Report; Application No. EP 18195581.6; European Patent Office; dated Mar. 6, 2019.

(Continued)

*Primary Examiner* — Nicholas McFall
*Assistant Examiner* — Terri L Filosi
(74) *Attorney, Agent, or Firm* — Lawrence Youst PLLC

(57) ABSTRACT

A rotary propulsion system for a tiltrotor aircraft operable to transition between rotary and non rotary flight modes. The rotary propulsion system includes an engine that is coupled to a freewheeling unit. A gear system has a torque path coupling assembly between a first gear assembly that is coupled to the freewheeling unit and a second gear assembly that is coupled to a proprotor assembly. The torque path coupling assembly has an engaged position wherein the output of the first gear assembly is coupled to the input of the second gear assembly thereby providing a torque path between the engine and the proprotor assembly. The torque path coupling assembly also has a disengaged position wherein the output of the first gear assembly is independent of the input of the second gear assembly thereby interrupting the torque path between the engine and the proprotor assembly.

16 Claims, 7 Drawing Sheets

(51) Int. Cl.
*F16D 41/069* (2006.01)
*B64D 35/04* (2006.01)

(56) References Cited

U.S. PATENT DOCUMENTS

| | | | |
|---|---|---|---|
| 6,622,962 | B1 | 9/2003 | White |
| 6,669,137 | B1 * | 12/2003 | Chen ........................ B64C 3/40 244/7 R |
| 8,231,503 | B2 | 7/2012 | Buelna |
| 8,567,582 | B2 * | 10/2013 | Silva ..................... F16D 23/025 192/53.3 |
| 8,998,125 | B2 | 4/2015 | Hollimon et al. |
| 2001/0017061 | A1 | 8/2001 | Friel |
| 2009/0224096 | A1 | 9/2009 | Waide et al. |
| 2016/0076629 | A1 | 3/2016 | Modrzejewski et al. |
| 2016/0152329 | A1 | 6/2016 | Tzeng et al. |

OTHER PUBLICATIONS

European Exam Report; Application No. EP 18195581.6; European Patent Office; dated Aug. 23, 2019.

\* cited by examiner

TORQUE PATH COUPLING ASSEMBLIES FOR TILTROTOR AIRCRAFT

TECHNICAL FIELD OF THE DISCLOSURE

The present disclosure relates, in general, to tiltrotor aircraft having rotary and non rotary flight modes and, in particular, to rotary propulsion systems for tiltrotor aircraft having a torque path coupling assembly between the engine and the proprotor assembly to selectively provide and interrupt the torque path therebetween.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

SUMMARY

In a first aspect, the present disclosure is directed to a rotary propulsion system for a tiltrotor aircraft operable to transition between rotary and non rotary flight modes. The rotary propulsion system includes an engine having an engine rotating speed in the non rotary flight mode. A freewheeling unit is coupled to the engine. A gear system has a torque path coupling assembly between first and second gear assemblies. The first gear assembly is coupled to the freewheeling unit and has an output. The second gear assembly has an input. A proprotor assembly is coupled to the second gear assembly and has a proprotor rotating speed in the non rotary flight mode. The proprotor assembly has a plurality of proprotor blades with a radially extended orientation. The torque path coupling assembly has an engaged position wherein the output of the first gear assembly is coupled to the input of the second gear assembly thereby providing a torque path between the engine and the proprotor assembly. The torque path coupling assembly has a disengaged position wherein the output of the first gear assembly is independent of the input of the second gear assembly thereby interrupting the torque path between the engine and the proprotor assembly.

In some embodiments, the freewheeling unit may be a sprag clutch. In certain embodiments, the torque path coupling assembly may include a coupling sleeve having internal splines that are in mesh with the input of the second gear assembly and in mesh with the output of the first gear assembly when the torque path coupling assembly is in the engaged position. In such embodiments, the internal splines of the coupling sleeve are not in mesh with the output of the first gear assembly when the torque path coupling assembly is in the disengaged position. In some embodiments, the torque path coupling assembly may include a synchronizing ring having outer splines and an inner friction cone. The outer splines may be operable to selectively align with the inner splines of the coupling sleeve. The inner friction cone may be operable for friction contact with an outer conical face of the output of the first gear assembly to synchronize the output rotating speed and the input rotating speed. In certain embodiments, the torque path coupling assembly may include a hub coupled to the input of the second gear assembly and a plurality of struts spring mounted to the hub such that axially shifting the coupling sleeve toward the output of the first gear assembly from the disengaged position causes the struts to contact the synchronizing ring to shift the inner friction cone of the synchronizing ring into friction contact with the outer conical face of the output of the first gear assembly.

In some embodiments, the rotating speed of the output of the first gear assembly is proportional to the engine rotating speed, the rotating speed of the input of the second gear assembly is proportional to the proprotor rotating speed, the torque path coupling assembly is shiftable from the disengaged position to the engaged position when the output rotating speed and the input rotating speed are synchronized and/or the input rotating speed is greater than the output rotating speed prior to synchronizing the output rotating speed and the input rotating speed. In certain embodiments, the input rotating speed may be between about 0.5 percent and about 1 percent greater than the output rotating speed prior to synchronizing the output rotating speed and the input rotating speed. In other embodiments, the input rotating speed may be between about 1 percent and about 2 percent greater than the output rotating speed prior to synchronizing the output rotating speed and the input rotating speed.

In a second aspect, the present disclosure is directed to a tiltrotor aircraft operable to transition between rotary and non rotary flight modes. The tiltrotor aircraft includes an engine having an engine rotating speed in the non rotary flight mode. A freewheeling unit is coupled to the engine. A proprotor assembly has a plurality of proprotor blades with a radially extended orientation and a proprotor rotating speed in the non rotary flight mode. A gear system has a torque path coupling assembly between first and second gear assemblies. The first gear assembly is coupled to the freewheeling unit and has an output with an output rotating speed that is proportional to the engine rotating speed. The second gear assembly is coupled to the proprotor assembly and has an input with an input rotating speed that is proportional to the proprotor rotating speed. The torque path coupling assembly has an engaged position wherein the output of the first gear assembly is coupled to the input of the second gear assembly thereby providing a torque path between the engine and the proprotor assembly. The torque path coupling assembly has a disengaged position wherein the output of the first gear assembly is independent of the input of the second gear assembly thereby interrupting the torque path between the engine and the proprotor assembly. The torque path coupling assembly is shiftable from the disengaged position to the engaged position when the output rotating speed and the input rotating speed are synchronized.

In certain embodiments, the engine may be selectively operable in a turboshaft mode and a turbofan mode. In some embodiments, the input rotating speed is greater than the output rotating speed prior to synchronizing the output rotating speed and the input rotating speed. In certain embodiments, the proprotor rotating speed in the non rotary flight mode may be generated responsive to aerodynamic forces acting on the proprotor blades. In some embodiments, the proprotor blades may have a non rotating and folded configuration in the non rotary flight mode.

In a third aspect, the present disclosure is directed to a method of transitioning a tiltrotor aircraft from a non rotary flight mode to a rotary flight mode. The method includes operating an engine in a turbofan mode at an engine rotating speed; rotating an output of a first gear assembly of a gear system at an output rotating speed that is proportional to the engine rotating speed, a freewheeling unit coupled between the engine and the first gear assembly; rotating a proprotor assembly at a proprotor rotating speed responsive to aerodynamic forces acting on a plurality of proprotor blades; rotating an input of a second gear assembly of the gear system at an input rotating speed that is proportional to the proprotor rotating speed, the input rotating speed being greater than the output rotating speed; and actuating a torque path coupling assembly of the gear system from a disengaged position wherein the output of the first gear assembly is independent of the input of the second gear assembly thereby interrupting a torque path between the engine and the proprotor assembly to an engaged position including synchronizing the rotating speed of the output of the first gear assembly with the rotating speed of the input of the second gear assembly and coupling the output of the first gear assembly to the input of the second gear assembly thereby providing the torque path between the engine and the proprotor assembly to operate the engine in a turboshaft mode.

The method may also include establishing the input rotating speed between about 0.5 percent and about 1 percent higher than the output rotating speed prior to synchronizing the output rotating speed and the input rotating speed; establishing the input rotating speed between about 1 percent and about 2 percent higher than the output rotating speed prior to synchronizing the output rotating speed and the input rotating speed; increasing the engine rotating speed to transition the freewheeling unit from an over running mode to a driving mode after actuating the torque path coupling assembly; shifting an inner friction cone of a synchronizing ring into frictional contact with an outer conical face of the output of the first gear assembly and/or shifting a coupling sleeve having internal splines in mesh with the input of the second gear assembly and the output of the first gear assembly to provide the torque path between the engine and the proprotor assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
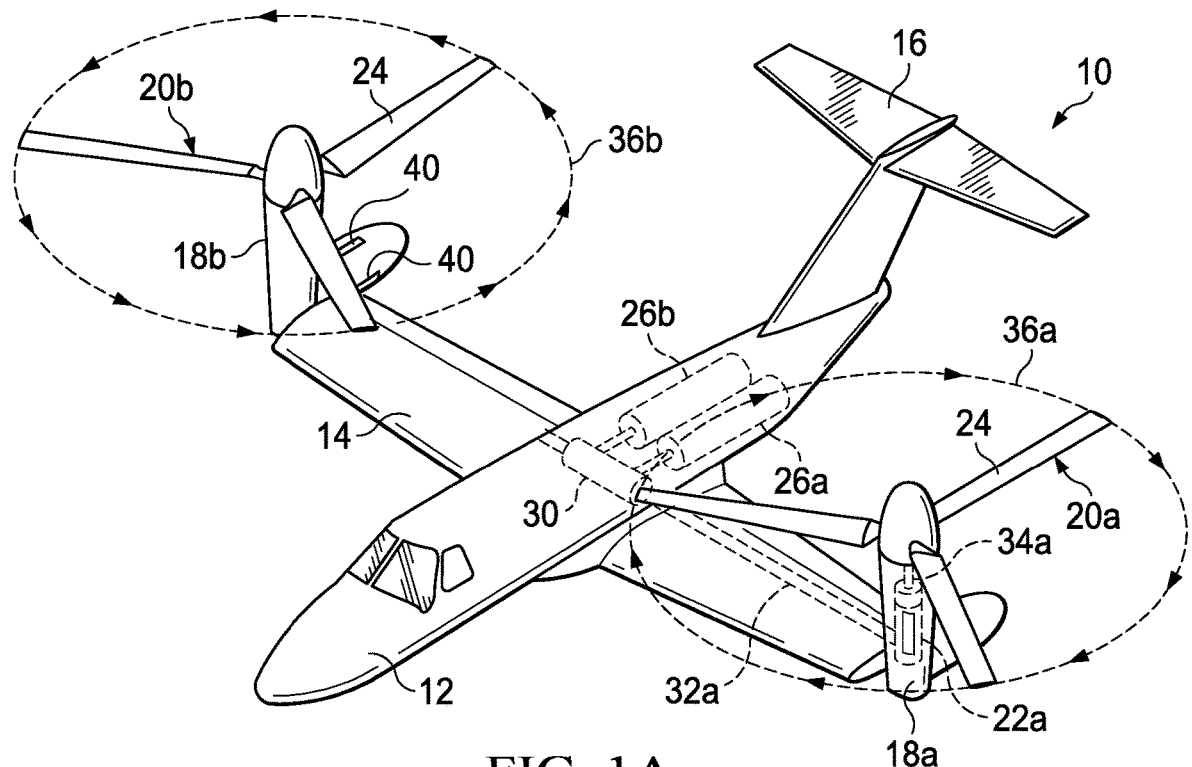
FIGS. 1A-1D are schematic illustrations of a tiltrotor aircraft in various flight modes in accordance with embodiments of the present disclosure.
Figure 1B:
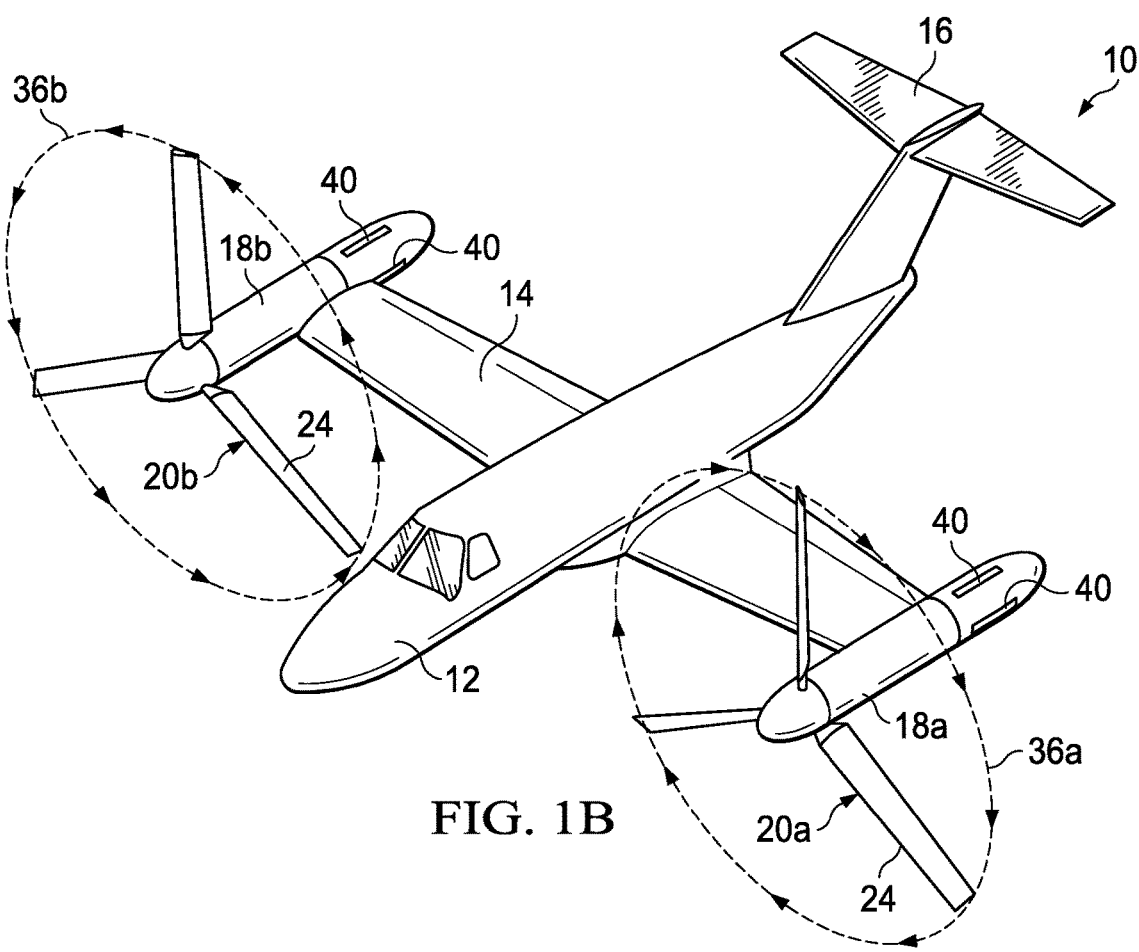
Figure 1C:
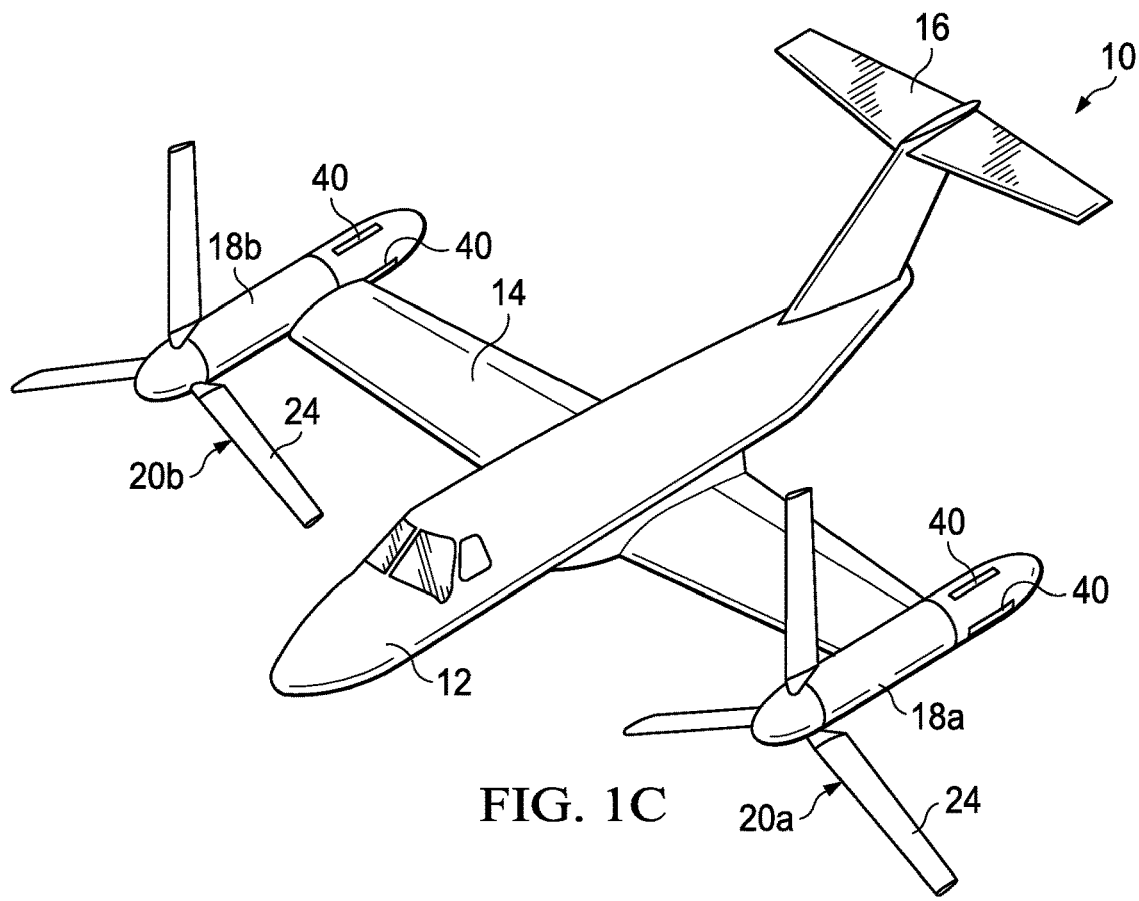
Figure 1D:
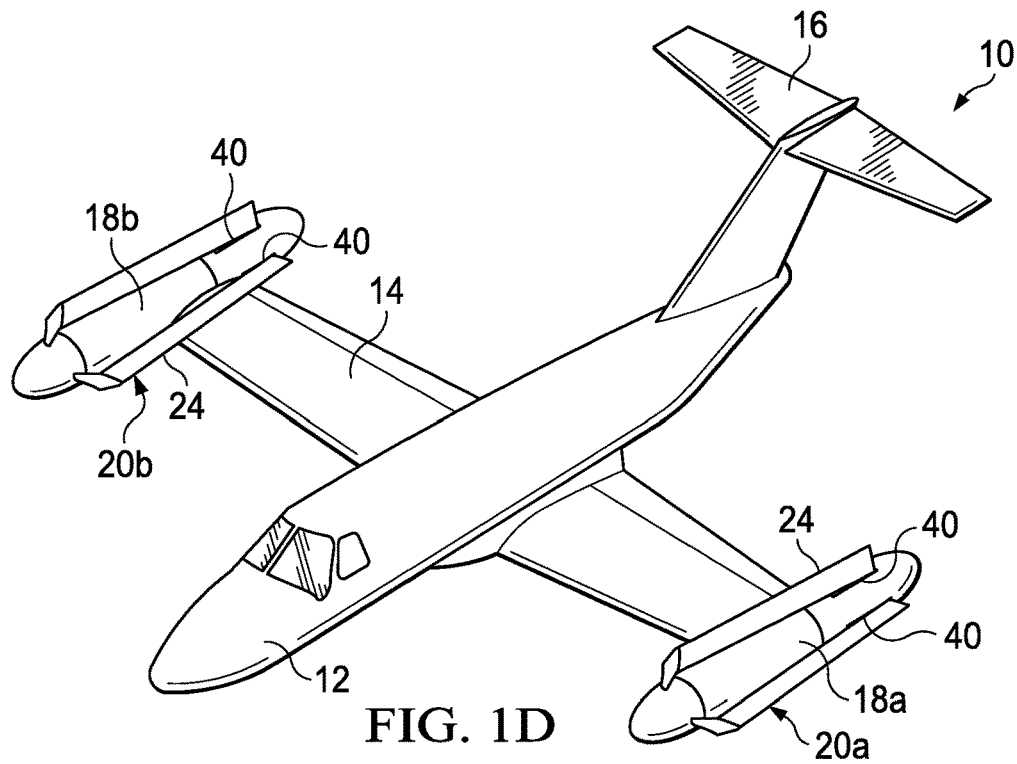

Referring to FIGS. 1A-1D in the drawings, a tiltrotor aircraft is schematically illustrated and generally designated 10. Aircraft 10 includes a fuselage 12, a wing 14 and tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. For example, a proprotor gearbox 22a is housed within pylon assembly 18a. Each proprotor gearbox includes a proprotor gearbox housing and a plurality of gears, such as planetary gears, used to adjust the engine output to a suitable rotational speed so that the engines and the proprotor assemblies may rotate at optimum speeds in rotary flight modes of aircraft 10.

Each proprotor assembly 20a, 20b includes a plurality of proprotor blades 24 that are operable to be rotated, as best seen in FIGS. 1A-1B, operable to be feathered, stopped, clocked and locked, as best seen in FIG. 1C and operable to be folded, as best seen in FIG. 1D. In the illustrated embodiment, proprotor assembly 20a is rotated responsive to torque and rotational energy provided by one or both of engines 26a, 26b via mid-wing gearbox 30, output shaft 32a, proprotor gearbox 22a and a mast 34a. Similarly, proprotor assembly 20b is rotated responsive to torque and rotational energy provided by one or both of engines 26a, 26b via mid-wing gearbox 30, an output shaft (not pictured), a proprotor gearbox (not pictured) and a mast (not pictured). Engines 26a, 26b are located in the aft portion of fuselage 12. Engines 26a, 26b may be operated in either a turboshaft mode, as best seen in FIGS. 1A-1B or a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide vertical lift, such that aircraft 10 flies much like a conventional helicopter. In this configuration, engines 26a, 26b are operating in turboshaft mode wherein hot combustion gases in each engine 26a, 26b cause rotation of a power turbine that is mechanically coupled to proprotor assemblies 20a, 20b. Thus, in this configuration, aircraft 10 is considered to be in a rotary flight mode, wherein the rotary propulsion system of aircraft 10, including engines 26a, 26b, mid-wing gearbox 30, the proprotor gearboxes and proprotor assemblies 20a, 20b as well as the shafts and/or other elements coupled therebetween provides thrust, in the form of vertical lift, for aircraft 10. FIG. 1B illustrates aircraft 10 in proprotor forward flight mode, in which proprotor assemblies 20a, 20b are rotating in a substantially vertical plane to provide forward thrust enabling wing 14 to provide a lifting force responsive to forward airspeed, such that aircraft 10 flies much like a conventional propeller driven aircraft. In this configuration, engines 26a, 26b are operating in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 36a, and proprotor assembly 20b rotates counterclockwise, as indicated by motion arrows 36b. In the illustrated embodiment, proprotor assemblies 20a, 20b each include three proprotor blades 24 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

FIG. 1C illustrates aircraft 10 in transition from proprotor forward flight mode to airplane forward flight mode, in which the torque path between engines 26a, 26b and proprotor assemblies 20a, 20b has been interrupted and proprotor blades 24 have been feathered, or oriented to be streamlined in the direction of flight, such that proprotor blades 24 act as brakes to aerodynamically slow the rotation of proprotor assemblies 20a, 20b. In the illustrated embodiment, the rotation of proprotor assemblies 20a, 20b is stopped using, for example, brake systems. Preferably, the brake systems include position sensors such that the output shafts can be stopped at predetermined rotational positions. By stopping the output shafts in known rotational positions, the rotational positions of proprotor assemblies 20a, 20b is also known. This rotational clocking of proprotor blades 24 is important to prevent contact with wing 14 and to align each proprotor blade 24 with a respective slot 40 in pylon assemblies 18a, 18b for folding. In the illustrated configuration of aircraft 10, engines 26a, 26b are operating in turbofan mode wherein hot combustion gases in each engine 26a, 26b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. In this configuration, aircraft 10 is considered to be in a non rotary flight mode as proprotor assemblies 20a, 20b are no longer providing thrust for aircraft 10.

FIG. 1D illustrates aircraft 10 in high speed, airplane forward flight mode, in which proprotor blades 24 have been folded to be oriented substantially parallel to respective pylon assemblies 18a, 18b to minimize the drag force generated by proprotor blades 24. To prevent chatter or other movement of proprotor blades 24 when folded, proprotor blades 24 are preferably received within slots 40 of pylon assemblies 18a, 18b. In this configuration, engines 26a, 26b are operating in the turbofan mode and aircraft 10 is considered to be in the non rotary flight mode. The forward cruising speed of aircraft 10 can be significantly higher in airplane forward flight mode versus proprotor forward flight mode as the forward airspeed induced proprotor aeroelastic instability is overcome.

Figure 2:
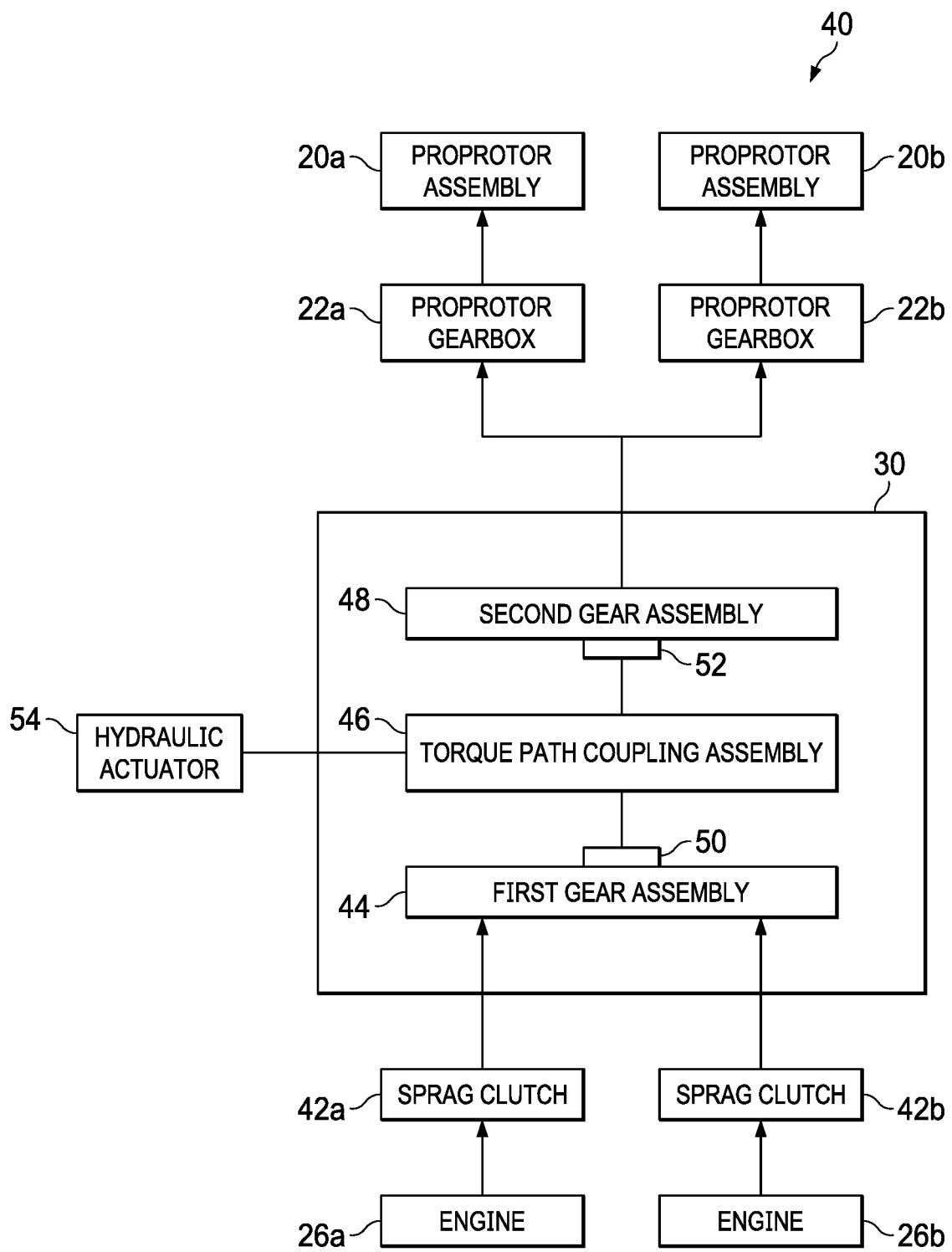
FIG. 2 is a block diagram of a rotary propulsion system having a torque path coupling assembly for use in a tiltrotor aircraft in accordance with embodiments of the present disclosure.

Referring additionally to FIG. 2, the rotary propulsion system of aircraft 10 will be described in greater detail. In the illustrated embodiment, the rotary propulsion system includes engines 26a, 26b, mid-wing gearbox 30, proprotor gearboxes 22a, 22b and proprotor assemblies 20a, 20b. A freewheeling unit depicted as sprag clutch 42a is coupled between engine 26a and mid-wing gearbox 30. Likewise, a freewheeling unit depicted as sprag clutch 42b is coupled between engine 26b and mid-wing gearbox 30. Sprag clutches 42a, 42b have a drive mode wherein torque from engines 26a, 26b is coupled to mid-wing gearbox 30 when the input rotating speed to sprag clutches 42a, 42b is matched with the output rotating speed from sprag clutches 42a, 42b. In addition, sprag clutches 42a, 42b have an over running mode wherein torque from engines 26a, 26b is not coupled to mid-wing gearbox 30 when the input rotating speed to sprag clutches 42a, 42b is less than the output rotating speed from sprag clutches 42a, 42b. As discussed herein, operating sprag clutches 42a, 42b in the over running mode aids in transitioning aircraft 10 from the non rotary flight mode to the rotary flight mode.

In the illustrated embodiment, mid-wing gearbox 30 includes a gear system having a first gear assembly 44, a torque path coupling assembly 46 and a second gear assembly 48. In other embodiments, the gear system could be housed in multi discrete gearboxes that are coupled together with suitable shafts. First gear assembly 44 is coupled to each of sprag clutches 42a, 42b and is operable to be driven by one or both of engines 26a, 26b. First gear assembly 44 may include one or more gears or gear subassemblies such as spiral beveled gear sets to change the direction of the torque from sprag clutches 42a, 42b. First gear assembly 44 includes an output 50, such as an output gear and/or output shaft, that is rotatable during operation of first gear assembly 44. In the illustrated embodiment, the rotating speed of output 50 is proportional to the rotating speed of engines 26a, 26b when sprag clutches 42a, 42b are in drive mode based upon the gear ratio of first gear assembly 44. Second gear assembly 48 is coupled to each of proprotor gearboxes 22a, 22b and thus to proprotor assemblies 20a, 20b by one or more shafts. Second gear assembly 48 may include one or more gears or gear subassemblies. Second gear assembly 48 includes an input 52, such as an input gear and/or input shaft, that is rotatable during operation of second gear assembly 48. In the illustrated embodiment, the rotating speed of input 52 is proportional to the rotating speed of proprotor assemblies 20a, 20b based upon the gear ratio of second gear assembly 48 and proprotor gearboxes 22a, 22b.

In the illustrated embodiment, torque path coupling assembly 46 is positioned between output 50 of first gear assembly 44 and input 52 of second gear assembly 48. Torque path coupling assembly 46 is operable to selectively provide and interrupt the torque path between output 50 of first gear assembly 44 and input 52 of second gear assembly 48 and thus between engines 26a, 26b and proprotor assemblies 20a, 20b. Torque path coupling assembly 46 is shiftable between engaged and disengaged positions by a hydraulic actuator 54 or other suitable actuation system that is controlled by the pilot and/or the flight control system of aircraft 10. In the engaged position, torque path coupling assembly 46 couples output 50 of first gear assembly 44 with input 52 of second gear assembly 48 such that output 50 of first gear assembly 44 and input 52 of second gear assembly 48 rotate at the same speed and torque is coupled therebetween. In the disengaged position of torque path coupling assembly 46, output 50 of first gear assembly 44 is independent of input 52 of second gear assembly 48 such that output 50 of first gear assembly 44 and input 52 of second gear assembly 48 may rotate at different speeds and torque is not coupled therebetween.

Referring again to FIG. 1B, aircraft 10 is represented in transition from airplane flight mode to proprotor forward flight mode. As stated, in airplane flight mode, aircraft 10 is considered to be in a non rotary flight mode as proprotor assemblies 20a, 20b are not providing thrust for aircraft 10 and torque from engines 26a, 26b is interrupted due to the disengaged position of torque path coupling assembly 46. In the illustrated configuration, proprotor blades 24 have been transitioned from the folded configuration in FIG. 1D to the radially extended configuration in FIG. 1C. Any brakes or locking mechanisms associated with proprotor assemblies 20a, 20b are now released, which allows proprotor assemblies 20a, 20b to windmill, as indicated by motion arrows 36a, 36b. The pitch of proprotor blades 24 may be collectively manipulated such that aerodynamic forces acting on proprotor blades 24 responsive to the forward airspeed of aircraft 10 cause proprotor assemblies 20a, 20b to rotate. The rotating speed of proprotor assemblies 20a, 20b is controlled based upon the pitch of proprotor blades 24, which is selected by the pilot and/or the flight control system of aircraft 10.

Since the rotating speed of input 52 is proportional to the rotating speed of proprotor assemblies 20a, 20b, the rotating speed of input 52 is controlled based upon the pitch of proprotor blades 24. In addition, since the rotating speed of output 50 is proportional to the rotating speed of engines 26a, 26b, the rotating speed of output 50 is controlled based upon the engine rotating speed. It is noted that even when engines 26a, 26b are in turbofan mode, the power shafts of engines 26a, 26b continue to rotate which in turn drives sprag clutches 42a, 42a as well as first gear assembly 44 including output 50. As torque path coupling assembly 46 is in the disengaged position, however, torque is not coupled to input 52 of second gear assembly 48. In this disengaged position of torque path coupling assembly 46, the pitch of proprotor blades 24 is used to adjust the rotating speed of input 52 to be greater than the rotating speed of output 50. For example, the rotating speed of input 52 may be adjusted to be between about 0.5 percent and about 1 percent greater than the rotating speed of output 50. In another example, the rotating speed of input 52 may be adjusted to be between about 1 percent and about 2 percent greater than the rotating speed of output 50. In a further example, the rotating speed of input 52 may be adjusted to be between about 2 percent and about 5 percent greater than the rotating speed of output 50. Operating mid-wing gearbox 30 with the rotating speed of input 52 greater than the rotating speed of output 50 allows aircraft 10 to take advantage of the over running mode of sprag clutches 42a, 42b during the transition from non rotary flight mode to rotary flight mode, as discussed herein.

Figure 3A:
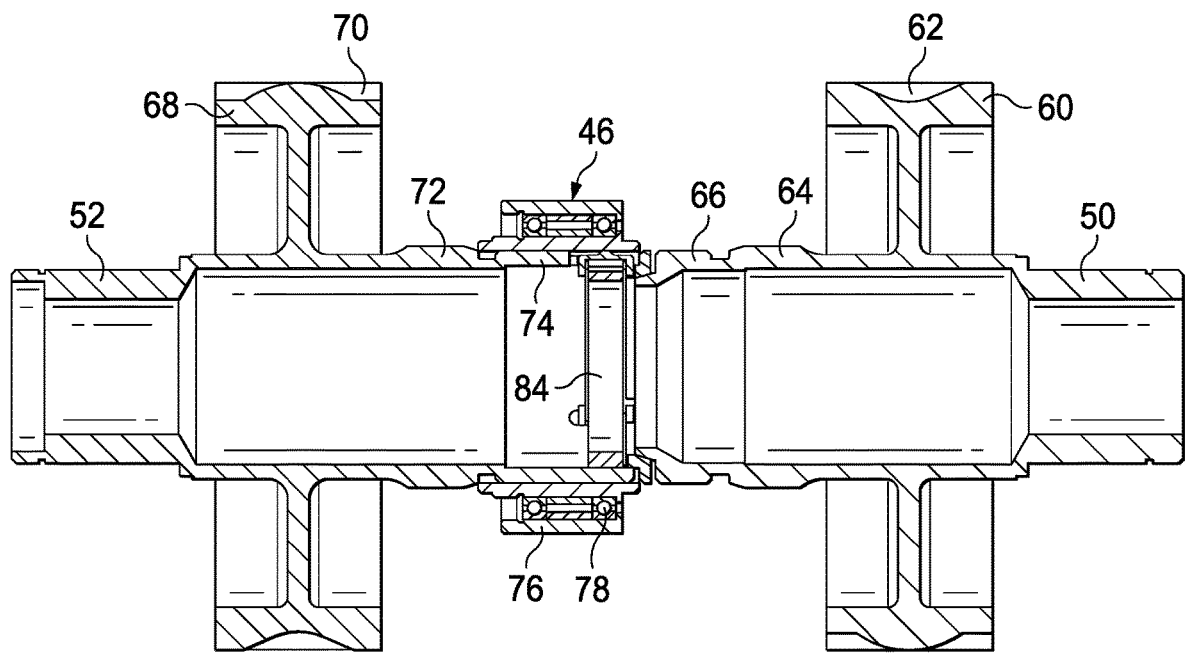
FIGS. 3A-3D are cross sectional views of a torque path coupling assembly for use in a rotary propulsion system of a tiltrotor aircraft in accordance with embodiments of the present disclosure.
Figure 3B:
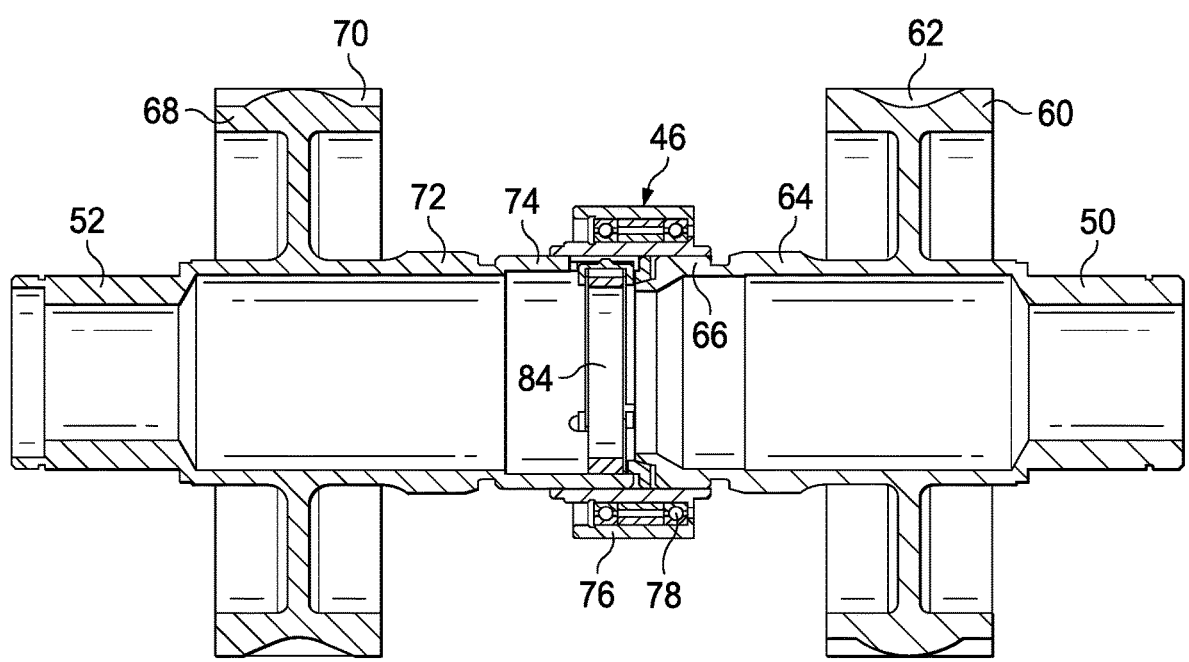
Figure 3C:
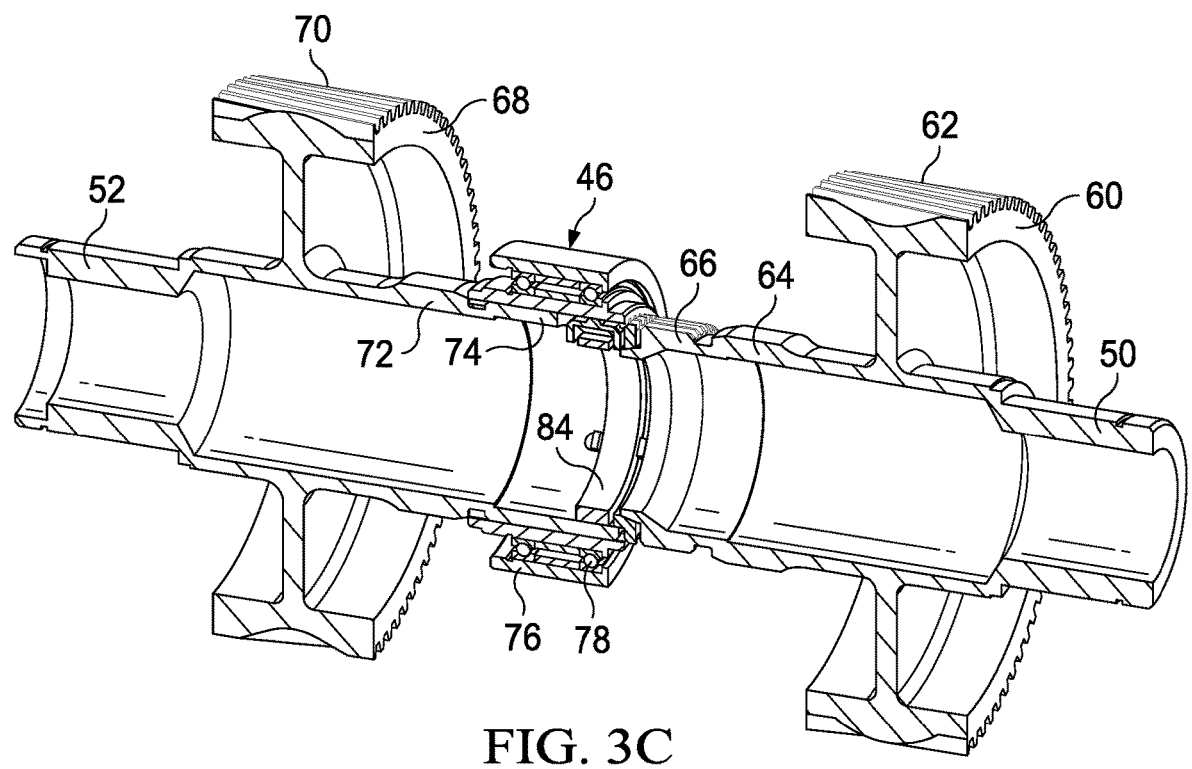
Figure 3D:
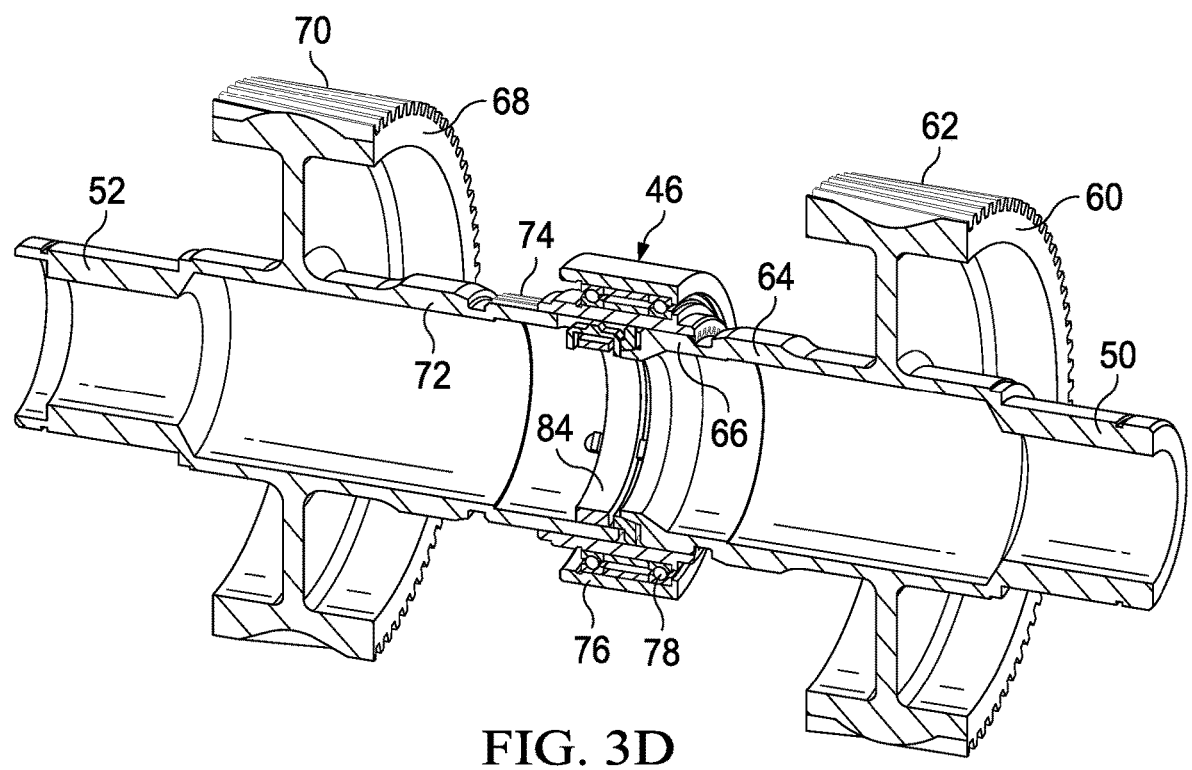

Referring additionally to FIGS. 3A-3D, a portion of the gear system of mid-wing gearbox 30 is depicted. In the illustrated embodiment, output 50 of first gear assembly 44 includes a gear element 60 having a plurality of external teeth 62 that are operable to mesh with another gear element (not pictured) of first gear assembly 44. In addition, output 50 of first gear assembly 44 includes a shaft element 64 having external splines 66 that are operable to selectively mesh with torque path coupling assembly 46. In the illustrated embodiment, input 52 of second gear assembly 48 includes a gear element 68 having a plurality of external teeth 70 that are operable to mesh with another gear element (not pictured) of second gear assembly 48. In addition, input 52 of second gear assembly 48 includes a shaft element 72 having external splines 74 that are operable to mesh with torque path coupling assembly 46. FIGS. 3A and 3C show torque path coupling assembly 46 in the disengaged position wherein output 50 of first gear assembly 44 is independent of input 52 of second gear assembly 48 thereby interrupting the torque path between engines 26a, 26b and proprotor assemblies 20a, 20b. FIGS. 3B and 3D show torque path coupling assembly 46 in the engaged position wherein output 50 of first gear assembly 44 is coupled to input 52 of second gear assembly 48 thereby providing the torque path between engines 26a, 26b and proprotor assemblies 20a, 20b.

Referring additionally to FIGS. 4A-4D, torque path coupling assembly 46 includes a non rotating carriage 76 that is coupled to hydraulic actuator 54. Disposed within non rotating carriage 76 is a bearing assembly depicted as ball bearing assembly 78 to allow relative rotation between non rotating carriage 76 and the rotating elements of torque path coupling assembly 46. Positioned within ball bearing assembly 78 is a coupling sleeve 80 having internal splines 82. Torque path coupling assembly 46 also includes a hub 84 that is coupled to input 52 of second gear assembly 48 with a plurality of struts 86 spring mounted therearound. In the illustrated embodiment, torque path coupling assembly 46 includes three spring mounted struts 86 but in other embodiments, a torque path coupling assembly could have other numbers of spring mounted struts. Torque path coupling assembly 46 includes a synchronizing ring 88 having outer splines 90 and an inner friction cone 92.

The operation of torque path coupling assembly 46 will now be described with reference to FIGS. 1B and 4A-4D. Prior to actuating torque path coupling assembly 46 from the disengaged position (FIG. 4A), wherein the torque path between engines 26a, 26b and proprotor assemblies 20a, 20b is interrupted, to the engaged position (FIG. 4D), wherein the torque path between engines 26a, 26b and proprotor assemblies 20a, 20b is provided, aircraft 10 is operated such that the rotating speed of input 52 to be greater than the rotating speed of output 50. As discussed herein, this is achieved by controlling the rotating speed of engines 26a, 26b and the rotating speed of proprotor assemblies 20a, 20b. In this configuration, input 52 rotates with coupling sleeve 80, hub 84, struts 86 and synchronizing ring 88. At the same time, output 50 rotates independent of input 52 at a slightly slow rotating speed. The pilot and/or flight control system of aircraft 10 now signals hydraulic actuator 50 to shift coupling sleeve 80 toward output 50 which causes struts 86 to contact synchronizing ring 88 bringing inner friction cone 92 of synchronizing ring 88 into friction contact with an outer conical face 94 of output 50. The friction contact causes an increase in the rotating speed of output 50, which causes sprag clutches 42a, 42b to operate in the over running mode as the input rotating speed to sprag clutches 42a, 42b is less than the output rotating speed from sprag clutches 42a, 42b. Operating sprag clutches 42a, 42b in the over running mode reduces and/or eliminates the applied torque from engines 26a, 26b allowing for smoother meshing of torque path coupling assembly 46 with outer splines 66 of output 50.

Figure 4A:
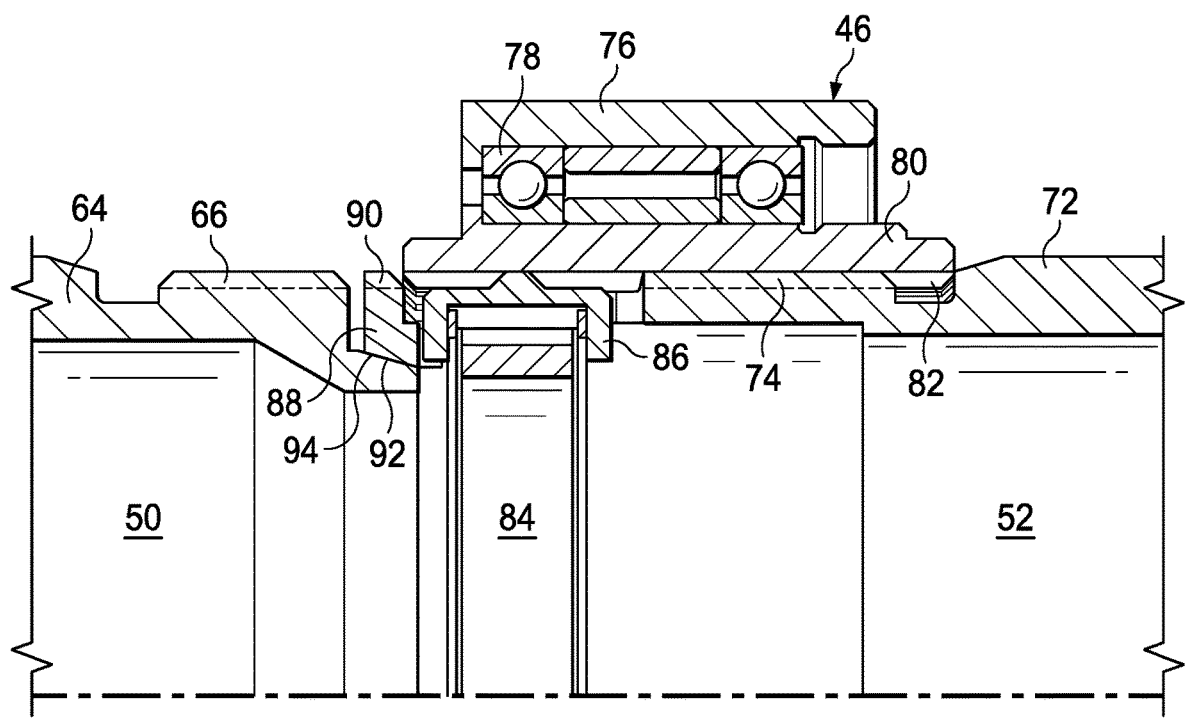
FIGS. 4A-4D are cross sectional views depicting the operation of a torque path coupling assembly for use in a rotary propulsion system of a tiltrotor aircraft in accordance with embodiments of the present disclosure.
Figure 4B:
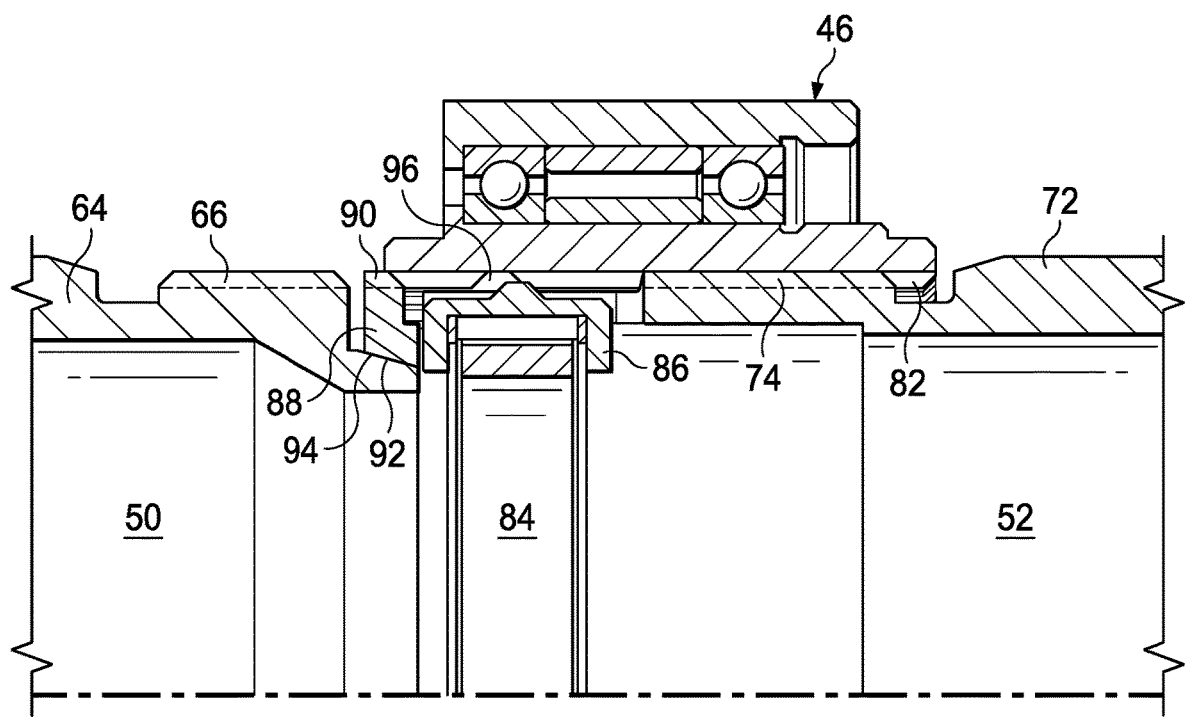
Figure 4C:
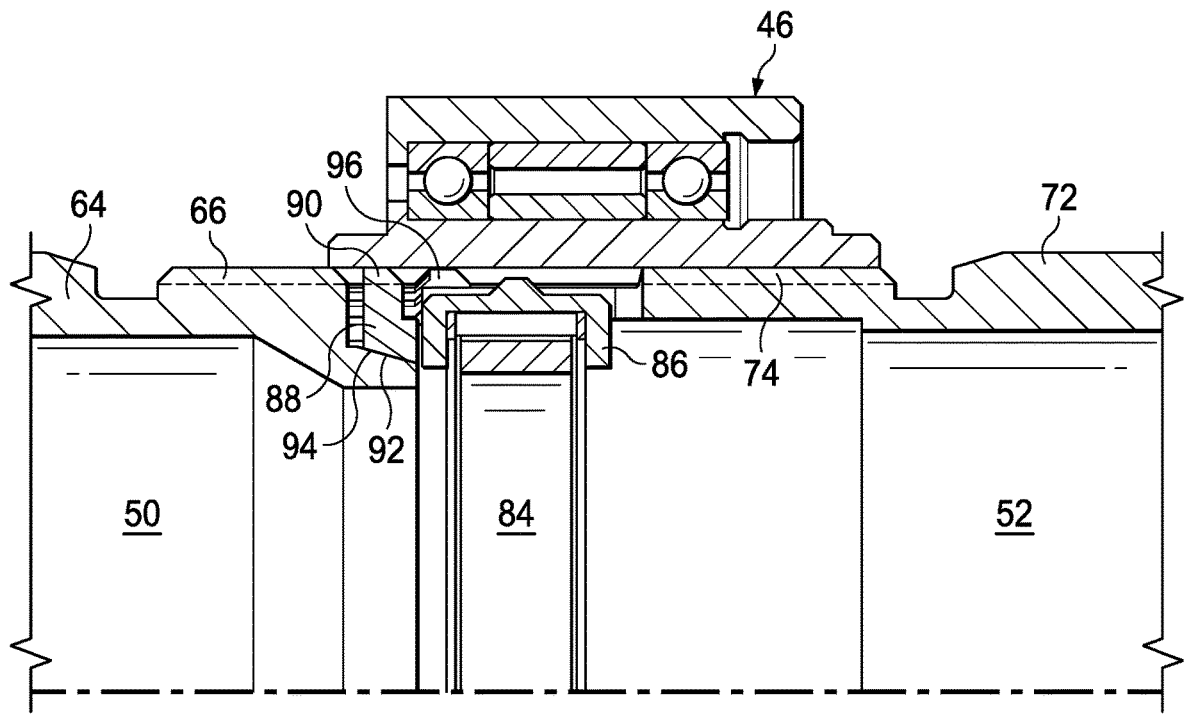

Once friction contact between inner friction cone 92 of synchronizing ring 88 and outer conical face 94 of output 50 is established, hydraulic actuator 54 shifts coupling sleeve 80 further toward output 50 which causes keys 96 to radially contact struts 86, as best seen in FIG. 4B. In this configuration, struts 86 no longer contact synchronizing ring 88, however, the front edges of inner splines 82 of coupling sleeve 80 maintain pressure on outer splines 90 of synchronizing ring 88 which maintains the friction contact between inner friction cone 92 of synchronizing ring 88 and outer conical face 94 of output 50. The friction contact between inner friction cone 92 of synchronizing ring 88 and outer conical face 94 of output 50 synchronizes the rotating speed of output 50 with the rotating speed of input 52. Further shifting of coupling sleeve 80 toward output 50 aligns inner splines 82 of coupling sleeve 80 with outer splines 90 of synchronizing ring 88 allowing inner splines 82 of coupling sleeve 80 to mesh with outer splines 90 of synchronizing ring 88, as best seen in FIG. 4C.

Figure 4D:
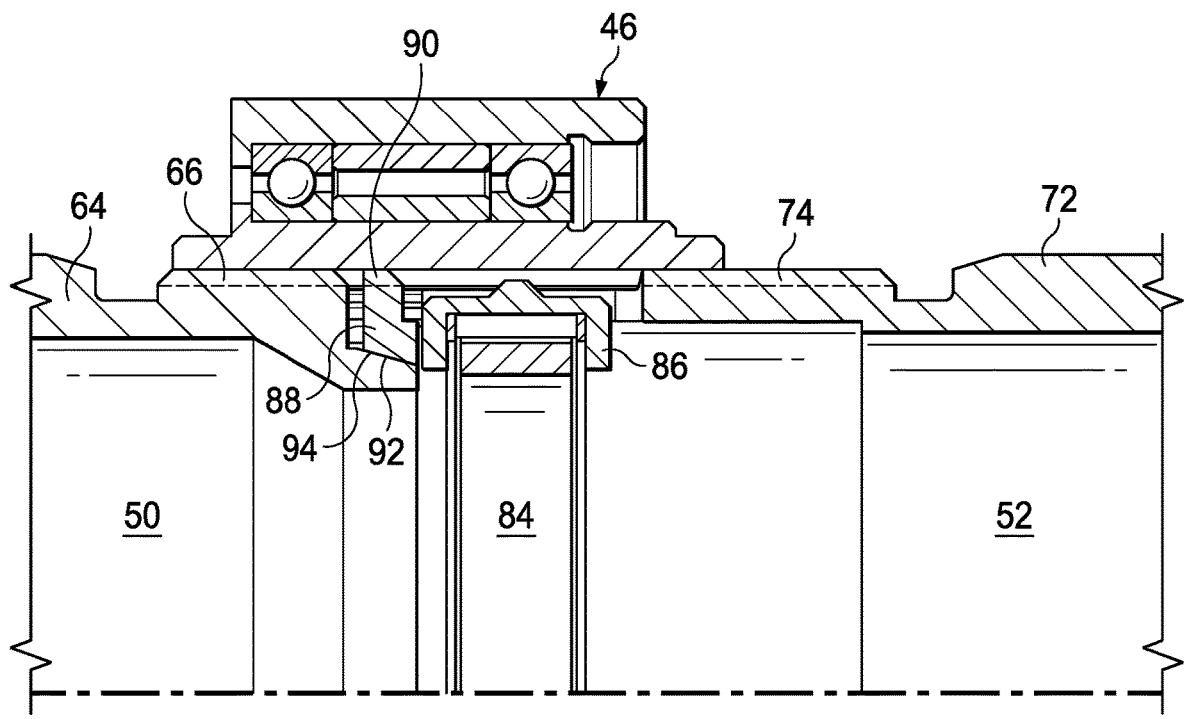

In this configuration, with sprag clutches 42a, 42b in the over running mode and the rotating speeds of output 50 and input 52 synchronizes, further shifting of coupling sleeve 80 toward output 50 brings inner splines 82 of coupling sleeve 80 in mesh with outer splines 66 of output 50, which is the engaged position of torque path coupling assembly 46, as best seen in FIG. 4D. In this engaged position of torque path coupling assembly 46, input 52 rotates with coupling sleeve 80 and output 50 as coupling sleeve 80 provides a torque path between output 50 of first gear assembly 44 and input 52 of second gear assembly 48 and thus between engines 26a, 26b and proprotor assemblies 20a, 20b. By increasing the operating speed of engines 26a, 26b, sprag clutches 42a, 42b transition from the over running mode to the drive mode such that engines 26a, 26b provide torque and rotational energy to proprotor assemblies 20a, 20b. Engines 26a, 26b are now operating in turboshaft mode and aircraft 10 is now operating in rotary flight mode.

Even though aircraft 10 has been described as having a rotary propulsion system having two engines located within the fuselage and two proprotor assemblies at outboard stations of the wing, it should be understood by those having ordinary skill in the art that other engine and other proprotor assembly arrangements are possible and are considered to be within the scope of the present disclosure. In addition, even though the rotary propulsion system has been described and illustrated in the context of tiltrotor aircraft 10, it should be understood by those having ordinary skill in the art that the rotary propulsion system disclosed herein can be implemented on other aircraft including, for example, multi rotor aircraft wherein selective operation of certain rotors during flight may be desirable.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotary propulsion system for a tiltrotor aircraft operable to transition between rotary and non rotary flight modes, the rotary propulsion system comprising:
   an engine having an engine rotating speed in the non rotary flight mode;
   a freewheeling unit coupled to the engine;
   a gear system having a torque path coupling assembly between first and second gear assemblies, the first gear assembly coupled to the freewheeling unit and having an output with an outer conical face, the second gear assembly having an input; and
   a proprotor assembly coupled to the second gear assembly, the proprotor assembly having a plurality of proprotor blades with a radially extended orientation and a proprotor rotating speed in the non rotary flight mode;
   wherein, the torque path coupling assembly has an engaged position wherein the output of the first gear assembly is coupled to the input of the second gear assembly thereby providing a torque path between the engine and the proprotor assembly and a disengaged position wherein the output of the first gear assembly is independent of the input of the second gear assembly thereby interrupting the torque path between the engine and the proprotor assembly;

wherein, the torque path coupling assembly includes a coupling sleeve and a synchronizing ring, the coupling sleeve having internal splines that are in mesh with the input of the second gear assembly and in mesh with the output of the first gear assembly when the torque path coupling assembly is in the engaged position, the synchronizing ring having outer splines and an inner friction cone, the outer splines operable to selectively align with the internal splines of the coupling sleeve; and wherein, the inner friction cone of the synchronizing ring is shifted into friction contact with the outer conical face of the output of the first gear assembly responsive to shifting the coupling sleeve to synchronize a rotating speed of the output of the first gear assembly and a rotating speed of the input of the second gear assembly.

2. The rotary propulsion system as recited in claim 1 wherein the freewheeling unit further comprises a sprag clutch.

3. The rotary propulsion system as recited in claim 1 wherein the internal splines of the coupling sleeve are not in mesh with the output of the first gear assembly when the torque path coupling assembly is in the disengaged position.

4. The rotary propulsion system as recited in claim 1 wherein the torque path coupling assembly further comprises a hub coupled to the input of the second gear assembly and a plurality of struts spring mounted to the hub; and wherein axially shifting the coupling sleeve toward the output of the first gear assembly from the disengaged position causes the struts to contact the synchronizing ring to shift the inner friction cone of the synchronizing ring into friction contact with the outer conical face of the output of the first gear assembly.

5. The rotary propulsion system as recited in claim 1 wherein the output of the first gear assembly has an output rotating speed that is proportional to the engine rotating speed;

wherein the input of the second gear assembly has an input rotating speed that is proportional to the proprotor rotating speed;

wherein the torque path coupling assembly is shiftable from the disengaged position to the engaged position when the output rotating speed and the input rotating speed are synchronized; and wherein the input rotating speed is greater than the output rotating speed prior to synchronizing the output rotating speed and the input rotating speed.

6. The rotary propulsion system as recited in claim 5 wherein the input rotating speed is between about 0.5 percent and about 1 percent greater than the output rotating speed prior to synchronizing the output rotating speed and the input rotating speed.

7. The rotary propulsion system as recited in claim 5 wherein the input rotating speed is between about 1 percent and about 2 percent greater than the output rotating speed prior to synchronizing the output rotating speed and the input rotating speed.

8. A tiltrotor aircraft operable to transition between rotary and non rotary flight modes, the tiltrotor aircraft comprising:

an engine having an engine rotating speed in the non rotary flight mode;

a freewheeling unit coupled to the engine;

a proprotor assembly having a plurality of proprotor blades with a radially extended orientation and a proprotor rotating speed in the non rotary flight mode; and a gear system having a torque path coupling assembly between first and second gear assemblies, the first gear assembly coupled to the freewheeling unit and having an output with an outer conical face and an output rotating speed that is proportional to the engine rotating speed, the second gear assembly coupled to the proprotor assembly and having an input with an input rotating speed that is proportional to the proprotor rotating speed;

wherein, the torque path coupling assembly has an engaged position wherein the output of the first gear assembly is coupled to the input of the second gear assembly thereby providing a torque path between the engine and the proprotor assembly;

wherein, the torque path coupling assembly has a disengaged position wherein the output of the first gear assembly is independent of the input of the second gear assembly thereby interrupting the torque path between the engine and the proprotor assembly;

wherein, the torque path coupling assembly includes a coupling sleeve and a synchronizing ring, the coupling sleeve having internal splines that are in mesh with the input of the second gear assembly and in mesh with the output of the first gear assembly when the torque path coupling assembly is in the engaged position, the synchronizing ring having outer splines and an inner friction cone, the outer splines operable to selectively align with the internal splines of the coupling sleeve; and wherein, the inner friction cone of the synchronizing ring is shifted into friction contact with the outer conical face of the output of the first gear assembly responsive to shifting the coupling sleeve to synchronize a rotating speed of the output of the first gear assembly and a rotating speed of the input of the second gear assembly; and wherein, the torque path coupling assembly is shiftable from the disengaged position to the engaged position when the rotating speeds of the output and the input are synchronized.

9. The tiltrotor aircraft as recited in claim 8 wherein the engine is operable in a turboshaft mode and a turbofan mode.

10. The tiltrotor aircraft as recited in claim 8 wherein the input rotating speed is greater than the output rotating speed prior to synchronizing the output rotating speed and the input rotating speed.

11. The tiltrotor aircraft as recited in claim 8 wherein the proprotor rotating speed in the non rotary flight mode is generated responsive to aerodynamic forces acting on the proprotor blades.

12. The tiltrotor aircraft as recited in claim 8 wherein the proprotor blades further comprise a non rotating and folded configuration in the non rotary flight mode.

13. A method of transitioning a tiltrotor aircraft from a non rotary flight mode to a rotary flight mode, the method comprising:

operating an engine in a turbofan mode at an engine rotating speed;

rotating an output of a first gear assembly at an output rotating speed that is proportional to the engine rotating speed, a freewheeling unit coupled between the engine and the first gear assembly;

rotating a proprotor assembly at a proprotor rotating speed responsive to aerodynamic forces acting on a plurality of proprotor blades;

rotating an input of a second gear assembly at an input rotating speed that is proportional to the proprotor rotating speed, the input rotating speed greater than the output rotating speed; and actuating a torque path coupling assembly from a disengaged position, wherein the output of the first gear assembly is independent of the input of the second gear assembly, thereby interrupting a torque path between the engine and the proprotor assembly, to an engaged position including synchronizing the output rotating speed with the input rotating speed by shifting an inner friction cone of a synchronizing ring into friction contact with an outer conical face of the output of the first gear assembly and coupling the output of the first gear assembly to the input of the second gear assembly by shifting internal splines of a coupling sleeve in mesh with outer splines of the synchronizing ring and in mesh with the output of the first gear assembly, thereby providing the torque path between the engine and the proprotor assembly to operate the engine in a turboshaft mode.

14. The method as recited in claim 13 further comprising establishing the input rotating speed between about 0.5 percent and about 1 percent higher than the output rotating speed prior to synchronizing the output rotating speed with the input rotating speed.

15. The method as recited in claim 13 further comprising establishing the input rotating speed between about 1 percent and about 2 percent higher than the output rotating speed prior to synchronizing the output rotating speed with the input rotating speed.

16. The method as recited in claim 13 further comprising increasing the engine rotating speed to transition the freewheeling unit from an over running mode to a driving mode after actuating the torque path coupling assembly.

\* \* \* \* \*